United States Patent [19]
Yoshida

[11] Patent Number: 5,649,305
[45] Date of Patent: Jul. 15, 1997

[54] MEMORY CALL ORIGINATION SYSTEM FOR AUTOMATICALLY ORIGINATING A CALL TO A CALLING PARTY

[75] Inventor: Toshio Yoshida, Tokyo, Japan

[73] Assignee: NEC Corporation, Tokyo, Japan

[21] Appl. No.: 365,310

[22] Filed: Dec. 28, 1994

[30] Foreign Application Priority Data

Dec. 28, 1993 [JP] Japan ..................... 5-335279

[51] Int. Cl.⁶ .................................. H04B 1/38
[52] U.S. Cl. ................ 455/70; 379/67; 379/88; 455/412; 455/564
[58] Field of Search ................ 455/33.1, 34.1, 455/34.2, 53.1, 54.1, 54.2, 56.1, 70; 379/37, 38, 40, 45, 111, 113, 127, 142, 88, 57, 58, 59, 62, 67

[56] References Cited

U.S. PATENT DOCUMENTS

| Re. 34,976 | 6/1995 | Helferich et al. ............. | 379/88 |
|---|---|---|---|
| 3,669,443 | 6/1972 | Weger ........................ | 455/89 |
| 4,616,110 | 6/1986 | Hashimoto .................. | 379/88 |
| 4,625,079 | 11/1986 | Castro et al. ................ | 379/77 |
| 4,661,472 | 4/1987 | Kai ............................ | 379/57 |
| 4,747,122 | 5/1988 | Bhagat et al. ............... | 379/57 |
| 5,081,668 | 1/1992 | Ito ............................. | 379/58 |
| 5,117,449 | 5/1992 | Metroka et al. ............. | 379/58 |
| 5,128,980 | 7/1992 | Choi .......................... | 379/56 |
| 5,251,250 | 10/1993 | Obata et al. ................ | 379/59 |
| 5,293,418 | 3/1994 | Fukawa ...................... | 379/58 |
| 5,333,176 | 7/1994 | Burke et al. ................. | 379/58 |
| 5,402,467 | 3/1995 | Watanabe .................. | 379/57 |
| 5,442,685 | 8/1995 | Sakata et al. ............... | 379/88 |
| 5,444,761 | 8/1995 | Nagashima ................. | 379/58 |

FOREIGN PATENT DOCUMENTS

| 4-314246 | 11/1992 | Japan . |
|---|---|---|
| 2251764 | 7/1992 | United Kingdom . |

Primary Examiner—Reinhard J. Eisenzopf
Assistant Examiner—Lee Nguyen
Attorney, Agent, or Firm—Sughrue, Mion, Zinn, Macpeak & Seas

[57] ABSTRACT

A transceiver records an identification number of a calling station included in a received control signal. The recording is done automatically in the event of unattended recording or in response to a record command during conversation. The transceiver originates a call in response to a transmission signal using the stored identification number of the calling station.

9 Claims, 5 Drawing Sheets

MEMORY CALL ORIGINATION SYSTEM FOR AUTOMATICALLY ORIGINATING A CALL TO A CALLING PARTY

BACKGROUND OF THE INVENTION

1. Field of the Invention

The present invention relates to a memory call origination system, and more particularly, to a memory call origination system associated with unattended recording and recording during communication available with a multi channel access (MCA) transmitter/receiver.

2. Description of the Related Art

A conventional wire message telephone is disclosed in, for example, Japanese Laid-Open Patent No. 314246/1992 (JP-A-04-314246). When a call comes in through the wire while the message telephone is in an unattended record mode, i.e., answer mode, an automatic answer section off-hooks and sends an answer message automatically. The answer message urges the calling person to send a speech message and a telephone number of the calling person. In order to send the telephone number, the caller dials his number, which is then transmitted over a speech channel as a dual tone multi-frequency (DTMF) signal. The speech message received from the calling person is stored into a speech recording section. The DTMF signal is converted to numerical data and stored into a dial recording section.

The user of the message telephone may then play back the recorded message. After the speech message stored in the speech recording section is played back, a reproducing section supplies a control signal for identification to the dial recording section. In response, the dial recording section originates a call automatically on the basis of the identified telephone number, by sending the telephone number in the form of a DTMF signal over a control channel.

As seen from the above description, in the conventional message telephone having a memory call origination system, a calling party may leave a speech message to be recorded by the called telephone system. The caller may also send its telephone number by dialing the number on the telephone set. The keyed telephone number is sent in the form of a DTMF signal over the speech channel. The DTMF signal is decoded and saved as numerical data by the receiving station.

Accordingly, in the system of the prior art, a caller number must be manually keyed in order for it to be received and saved by the receiving station. Moreover, since the number is transmitted as a DTMF signal over the speech channel, reliability is degraded when it is sent via a radio channel due to, for example, changes in electric field intensity and interference. In addition, in the system of the prior art, reception and storage of the calling number can be performed only during operation in answering mode.

Therefore, it is usually impossible to record the caller number during a conversation, and the conventional message telephone cannot be used to automatically originate a call to the caller number after the conversation has ended.

SUMMARY OF THE INVENTION

It is therefore an object of the present invention to provide a memory call origination system capable of recording a telephone number of the calling party included in a transmitted call signal.

Another object of the present invention is to provide a memory call origination system capable of extracting the telephone number of the calling party from the call signal transmitted over the control channel.

Yet another object of the present invention is to provide a memory call origination system capable recording a telephone number of the other party via a radio channel.

It is further object of the present invention to provide a memory call origination system capable of recalling a stored telephone number to originate a call to the other party who sent the recorded speech message.

The telephone answering system according to the present invention is capable of extracting and storing the telephone number of a calling party and, thereafter, automatically originating a call to that party by recalling its number from the memory. However, unlike the systems of the prior art, the system of the present invention extracts the calling number from a digital signal transmitted over the common control channel. This provides better reliability and accuracy. The extracted number is recorded digitally in a RAM and can be used to originate a call to the calling party.

When the calling party calls the number where the system is installed, the system receives a digital channel signal including an ID number of the calling party via a common control channel. The system extracts and records the ID number of the calling station. It then transmits a recorded message inviting the caller to leave a speech message. If a speech message is received from the calling party via a communication channel, the communication device records the received speech signal. The user may then instruct the system to read the recorded ID number and commence automatic calling of the recorded ID number.

More definitely, the communication device according to the present invention, receives a channel signal including a first identification number of the called station and a second identification number of the calling station over the control channel, and a speech signal over the speech channel. The communication device includes a first decoder which extracts the first identification number from the received channel signal to match it with the system's assigned ID number. A second decoder extracts the speech signal from the received channel signal. In In the preferred embodiment, the system includes a first memory for recording the second identification number when the first identification number is coincided with an assigned identification number, and a second memory for recording the speech signal.

Further, the communication device correlates the memory address of the received speech signal stored in the second memory with the memory address of the caller identification number stored in the first memory.

BRIEF DESCRIPTION OF THE DRAWINGS

The above and other objects, features and advantages of this invention will become more apparent from the following detailed description taken with the accompanying drawings in which.

In the drawings, the same reference numerals denote the same structural elements.

DESCRIPTION OF THE PREFERRED EMBODIMENT

Figure 1:
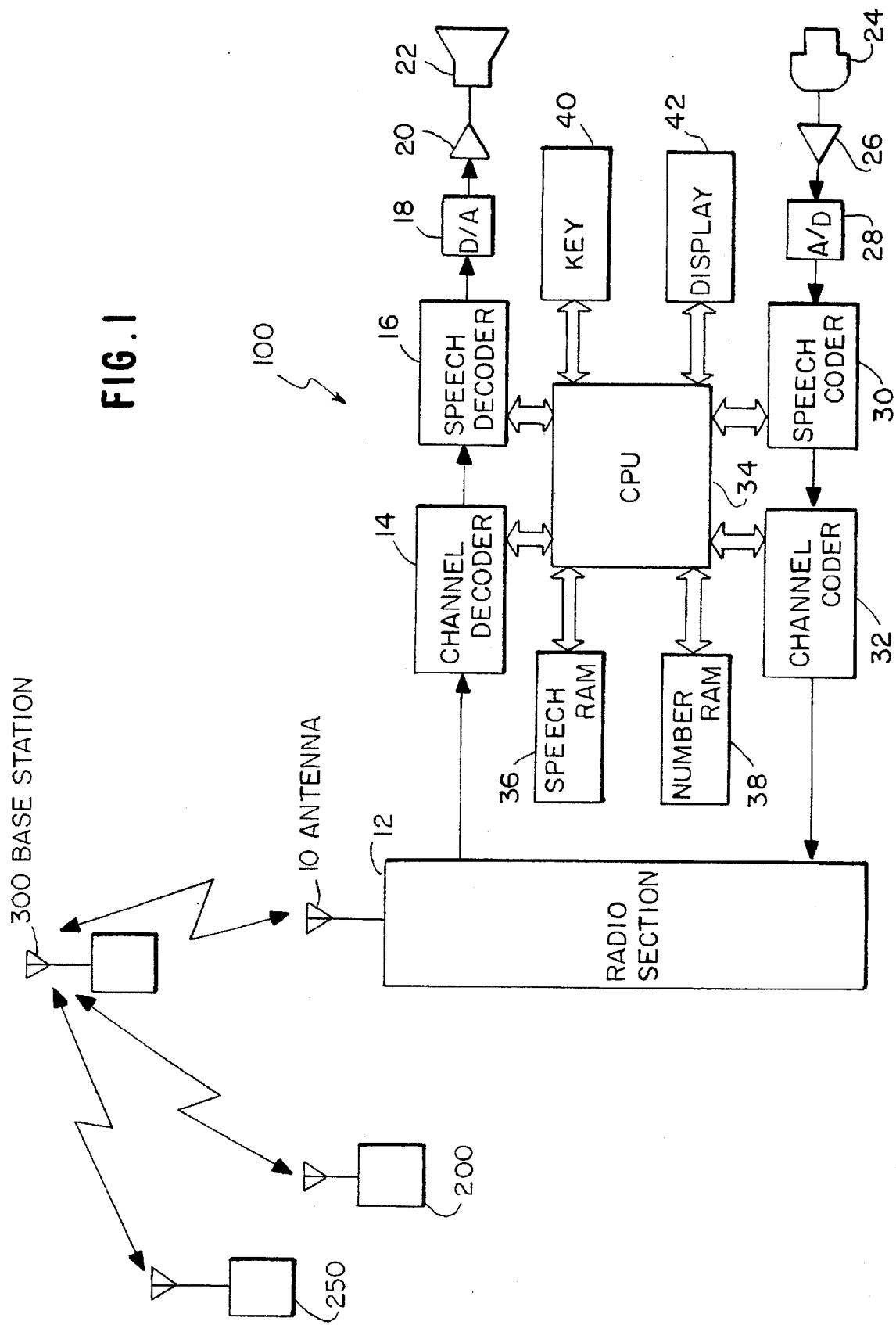
FIG. 1 is a block diagram of a preferred embodiment of the present invention.

FIG. 1 is a block diagram of a preferred embodiment of the present invention. In FIG. 1, an MCA transceiver system includes a plurality of MCA transceiver stations 100, 200 and 250, and a base station 300 which executes a duplicate communication with the MCA transceiver stations. Each MCA transceiver station has an answering system and an automatic calling system. The MCA transceiver station can operate in an answering mode and a communication mode. In the communication, i.e., non-answering mode, communication between a calling station and a called station is established to allow conversation between the called and calling parties. In the answering mode communication does not take place, but the calling party may leave a message. The message, received as a speech signal from the calling station, is stored into a memory of the called station. In the preferred embodiment, ID information and speech signals can be recorded in either mode of operation.

During reception of a signal, a radio section 12 of the called station 100 receives a digital channel signal via an antenna 10. A channel decoder 14 demodulates the digital channel signal to a demodulated signal. A speech decoder 16 decodes a speech signal included in the demodulated signal to a decoded speech signal supplied to a digital/analog (D/A) converter 18. The D/A converter 18 transforms the decoded speech signal to an analog speech signal. An audio amplifier 20 amplifies the analog speech signal and supplies the analog speech signal to a speaker 22.

When a user speaks into microphone 24, the microphone 24 sends a corresponding voice signal to a microphone amplifier 26 to be amplified to an adequate voltage for analog/digital conversion. An analog/digital (A/D) converter 28 converts the output voltage of the microphone amplifier 26 to a speech signal. A speech coder 30 encodes the speech signal to a coded digital speech signal. A channel coder 32 modulates the coded digital speech signal to a modulated signal. The radio section 12 sends the modulated signal via the antenna 10.

Each of the channel decoder 14 and channel coder 32 is, for example, constituted in a semiconductor chip DSP1610 made by AT&T. Each of the speech decoder 16 and speech coder 30 is constituted, for example, in a semiconductor chip MN1920813 made by Matsushita.

A CPU 34 controls the channel decoder 14, the speech decoder 16, the speech coder 30, the channel coder 32, a speech RAM 36, a number RAM 38, an operating section or key 40, and a display 42 as described later. The speech RAM 36 records the speech signal received from the speech decoder 16. If desired, the transmitted speech signal can also be recorded in the speech RAM 36. The number RAM 38 records the ID number of the calling party from the channel decoder 14. Although the speech RAM 36 and number RAM 38 are shown as separate memories, they can be implemented in a single memory unit. The operating section 40 is accessible for keying in commands meant for the CPU 34. The CPU 34 and operating section 40 constitutes a setting means for setting the transceiver into one of the answering mode and communication mode.

Figure 2A:
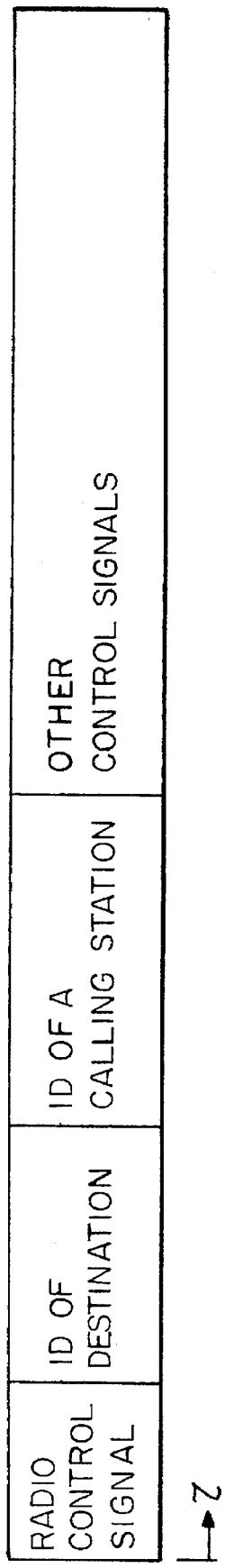
FIG. 2(a) illustrates a signal format of a digital channel signal in a common control channel used when a communication channel between a calling MCA transceiver station and a receiving MCA transceiver station, or a called station, is set.

FIG. 2(a) illustrates a signal format of the digital channel signal in a common control channel used when a communication channel between a calling MCA transceiver station and a receiving MCA transceiver station, or a called station, is set. For the purpose of illustration, the case is described where the station 200 is the calling station and the station 100 is the called station. The digital channel signal in the common control channel includes a radio control signal, an identification (ID) number of the called station 100 (FIG. 1), an identification number of the calling station 200 (FIG. 1), and other control signals including a group number or an additional message signal. When the ID number of the destination coincides with an assigned ID number, at least the ID number of the calling station, is extracted from the digital channel signal at the channel decoder 14 and stored into the number RAM 38.

Figure 2B:
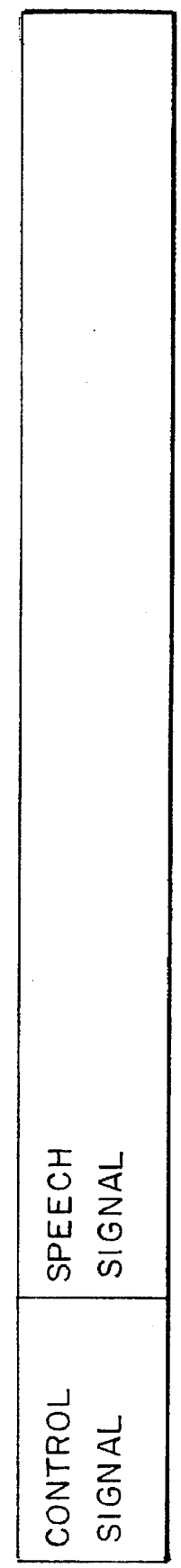
FIG. 2(b) illustrates a signal format of the digital channel signal in the communication channel.

FIG. 2(b) illustrates a signal format of the digital channel signal in the communication channel. The communication channel includes a control signal and a speech signal. The speech signal is extracted at the speech decoder 16 and is stored into the speech RAM 36 in the answering mode or when a record signal is input from the operating section 40.

Figure 3:
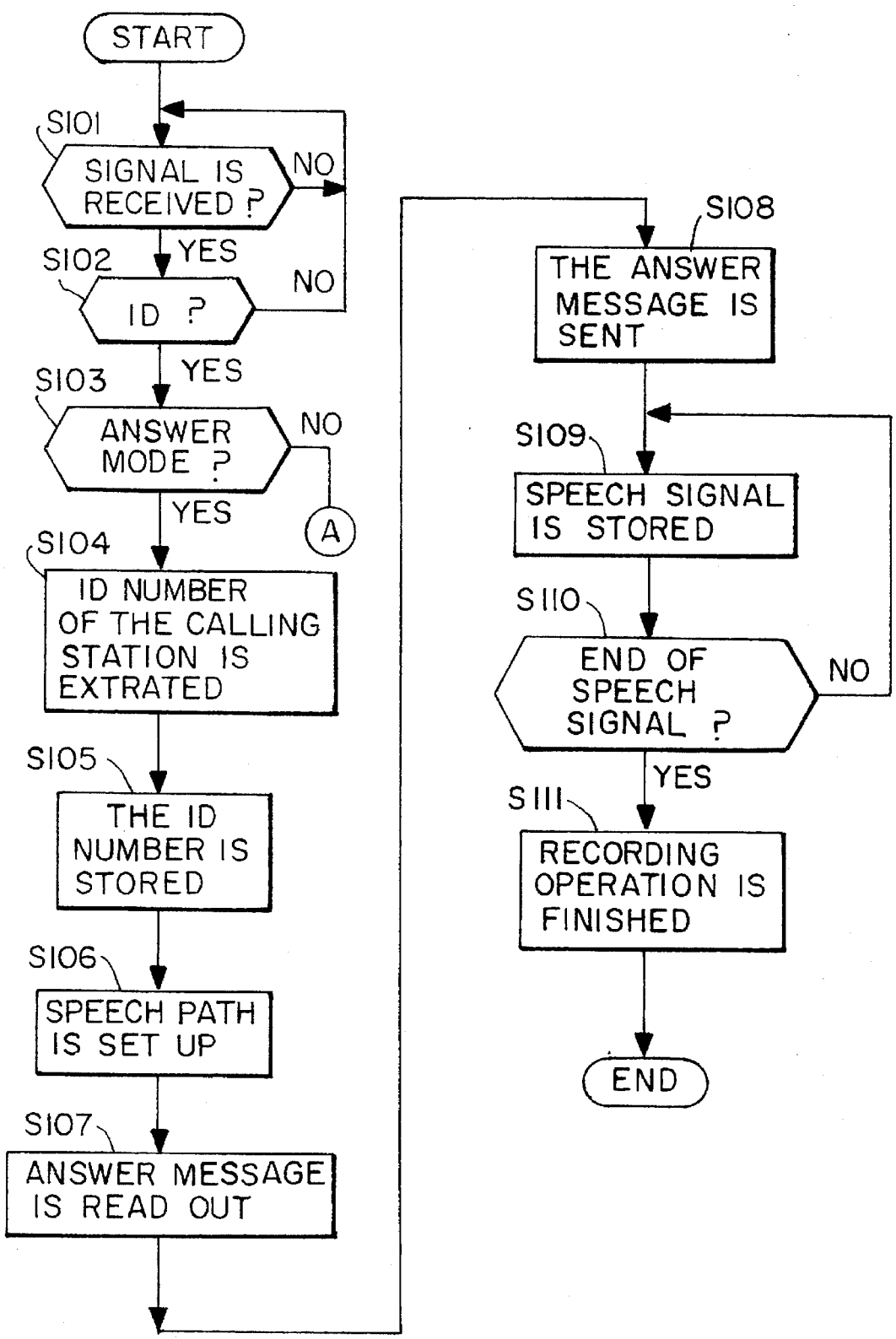
FIG. 3 is a flowchart demonstrating an operation of the CPU shown in FIG. 1 in the answering mode according to the present invention.

FIG. 3 is a flowchart demonstrating an operation of the CPU 34 in the answering mode. The MCA transceiver station 100 is set into the answering mode by the CPU 34 and operating section 40. When the radio section 12 of the MCA transceiver station 100 receives a digital channel signal of a common control channel (Step S101), the digital channel signal is supplied to the channel decoder 14 and demodulated into a demodulated signal. In response, An identification (ID) number of a called, or receiving station, 100 included in the demodulated signal is compared with an assigned ID number stored in the number RAM 38 (Step S102). If the received ID number coincides with the assigned ID number, the CPU 34 checks whether the MCA transceiver station 100 is in an automatic answering mode (Step S103). If the received ID number does not coincide with the assigned ID number, the CPU 34 returns to the same condition existing prior to receiving the digital channel signal.

When the MCA transceiver station 100 is in the answering mode (Step S103), an ID number of a calling station 200, a group number, and an additional information signal are extracted from the demodulated signal at the channel decoder 14 (Step S104) and the ID number of the calling station 200 is stored into the number RAM 38 (Step S105) through the CPU 34. The group number and the additional information signal may be also stored into the number RAM 38. Then, the CPU 34 sets up a speech path extending from the speech decoder 16 to the speech RAM 36 and the speaker 22 and a speech path extending from the speech RAM 36 to the speech coder 30 (Step S106). Subsequently, an answer message is read out of the speech RAM 36 (Step S107) and sent to the calling station via the speech coder 30 and channel coder 32 (Step S108). The answer message is attached to the ID number of the calling station 200 at the channel coder 32 and sent to the calling station 200.

On receiving a message or a speech signal from the calling station 200 via a communication channel, the speech signal is decoded at the speech decoder 16 and stored into the speech RAM 36 (Step S109). At this time, an address of the speech RAM 36 in which the speech signal is stored is the same as that of the number RAM 38 in, which the ID of the calling station 200 is stored. However, it is understood that other schemes can be employed to maintain correspondence between the speech signal address and the stored ID address. When the speech signal from the calling station 200 is finished (Step S110), the CPU 34 stops storing the speech signal (Step S111). For example, when a communication end signal from the calling station is detected, the CPU 34 executes a communication end, or release, processing (not shown).

As described above, the ID number of the calling station included in the digital channel signal is stored into the number RAM 38 in the answer mode.

Figure 4:
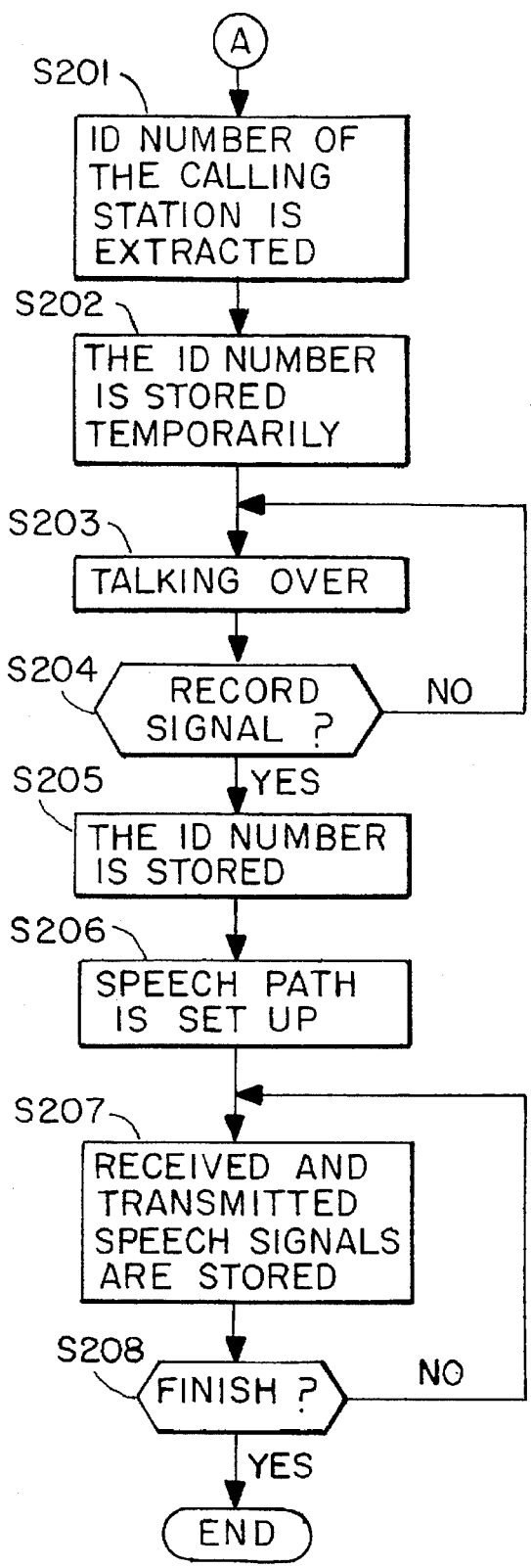
FIG. 4 is a flowchart demonstrating an operation of recording message not in the answer mode according to the present invention.

Next, there will be described in detail a message recording procedure during a communication. FIG. 4 is a flowchart demonstrating the operation of recording message not in the answer mode. When the transceiver 100 (FIG. 1) is not in the answer mode (Step S103 in FIG. 3), the ID number of the calling station 200, group number, and additional information signal are extracted from the demodulated signal (Step S201) and temporally stored into a memory of the CPU 34 (Step S202). The CPU 34 moves to a talking over condition (Step 203). In this condition, a received speech signal is transmitted from the speech decoder 16 to the speaker 22 and a transmission signal is sent from the microphone 24 to the speech coder 30. In the preferred embodiment, the speech decoder 16 and speech coder 30 are not energized when not in use. Therefore, in step S203 energy is supplied to the speech decoder 16 and speech coder 30 to allow communication.

During the conversation, the user of the transceiver station 100 may record the extracted data information of the calling station 200 by pressing the appropriate key on the operating section 40. In response, a record signal is sent to the CPU 34 (step S204) and the ID number of the calling station, group number, and additional information signal are transferred from the memory of the CPU 34 to the number RAM 38 (Step S205).

The transceiver station 100 may also be used to record the conversation. For that matter, the CPU 34 sets up a speech path extending from the speech coder 30 to the speech RAM 36 and a speech path extending from the speech decoder 16 to the speech RAM 36 (Step S206). A received speech signal from the speech decoder 16 and a transmitted speech signal from the speech coder 30 are stored to the speech RAM 36 through the CPU 34 (Step S207). An address to the stored received and transmitted speech signal in the speech RAM 36 is the same address as that of the number RAM 38 in which the ID number of the calling station is stored. Finally, when an end signal is sent from the operating section 40, the CPU 40 stops recording the speech signals (Step S208).

As seen from the above description, even though the receiving station is not in the answering mode, the ID number of the calling station and the speech signal are stored into the number RAM and the speech RAM, respectively. Although the transmitted speech is also stored into the speech RAM of the above-described embodiment, it is possible to record only the received speech signal or to dispense with recording any speech signals.

Furthermore, in the case of using one memory to store the received speech signal and the ID number into different addresses, the correspondence between the addresses is also stored into the memory.

Figure 5:
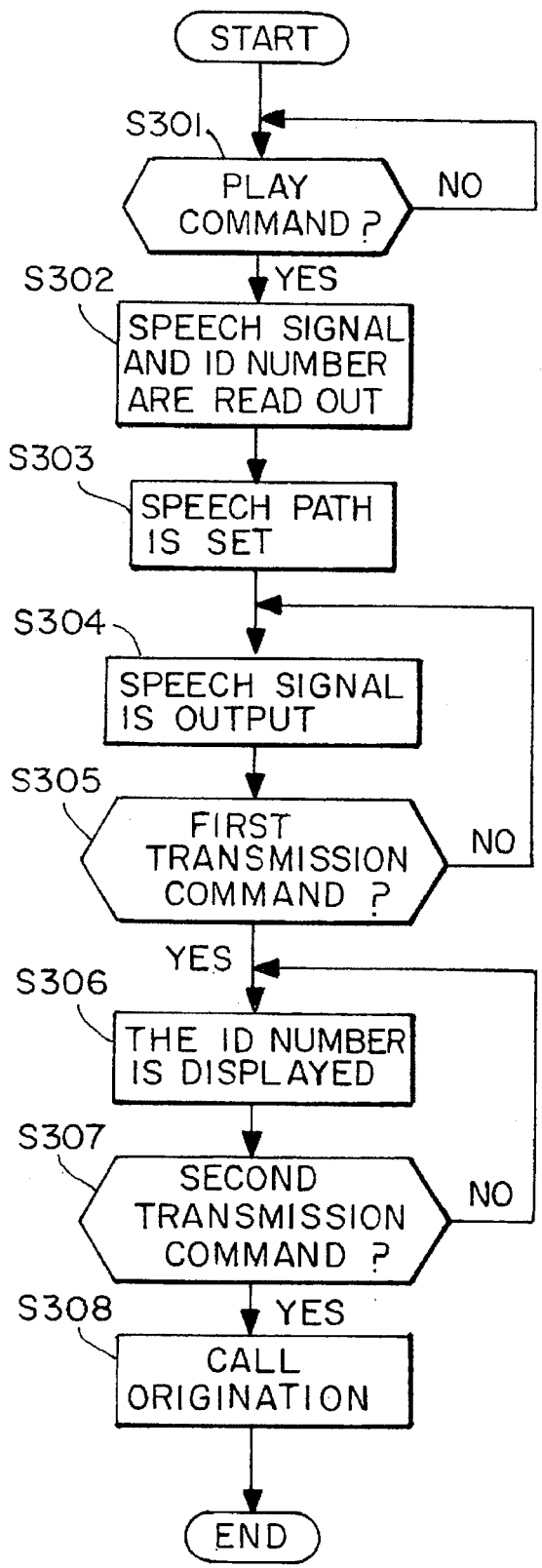
FIG. 5 is a flowchart demonstrating an operation of memory origination.

FIG. 5 is a flowchart demonstrating an operation of memory origination. This routine is executed whenever the user of the transceiver station 100 wishes to check the recorded messages. When a play command signal from the operating section 40 is received (Step S301), the CPU 34 reads a corresponding pair of the speech signal and the ID number designated on the operating section 40 out of the speech RAM 36 and number RAM 38, respectively (Step S302). For example, addresses in which the speech signal and the ID number are stored may be designated by the operating section 40 directly. For example, when a user chooses to listen to a particular message, e.g., the third message, he may push a key "3" in the operating section 40 and the appropriate address for the third message will be provided by the CPU 34. Alternatively, a first speech signal is read out of a first address of the speech RAM 36 in response to the play command signal from the operating section 40. If a message select signal is received from the operating section 40, the next speech signal of the second address is read. This operation is repeated until the designated speech signal is read. Next, the CPU 34 sets up a speech path extending from the speech RAM 36 to the speaker 22 via the speech decoder 16 (Step S303). Subsequently, the speech signal is sent to the speaker 22 (Step S304).

During or after the reproduction of the speech signal, the CPU 34 waits for a first transmission command signal. If the first transmission command signal is input from the operating section 40 (Step S305), the ID number of the calling station is displayed on the display 42 (Step S306). When the ID number is displayed, the CPU 34 waits for a second transmission command signal. If the second transmission command signal is received from the operating section 40 (Step S307), the CPU 34 commences automatic calling of the stored ID number, starting on memory origination by sending the ID number and group number of the station 200 being displayed to the channel coder 32 (Step S308). The ID number of the calling station 200 is sent to the base station 300 via the common control channel.

In the routine of FIG. 5, call origination is proceeded by two consecutive transmission commands. However, the routine can be modified to require only one transmission command. For example, step S307 can be eliminated and the routine can advance immediately to step S308.

The channel coder and decoder may have error correcting capability. This results in a high quality digital communication. Although the addresses in which the ID number and speech signal are stored into the number and speech RAMs, respectively, are the same, it is possible to record the ID number and speech signal in the different addresses, respectively. In this case, a correspondence between each addresses in which the ID number and speech signal are stored is stored into a third RAM (not shown).

As described hereinbefore, according to the present invention, since an identification number of a calling station included in a received digital channel signal is stored in an answer mode, it is unnecessary for the calling station to manually send the identification number by DTMF signal. In addition, it is possible to execute memory origination, i.e., save the caller's ID information, even though a speech signal is stored during ordinary conversation in communication mode.

Moreover, since the identification number is sent over a high quality digital control channel having an error correcting capability, it is reliable even when sent by way of a radio channel.

While the invention has been described with reference to specific embodiments thereof, it will be appreciated by those skilled in the art that numerous variations, modifications, and embodiments are possible, and accordingly, all such variations, modifications, and embodiments are to be regarded as being within the spirit and scope of the invention.

What is claimed is:

1. A communication device which receives a control signal over a control channel and a first speech signal over a speech channel, the control signal including a first identification number of a called station and a second identification number of a calling station, comprising:

a first decoder for extracting said first and second identification numbers from said received control signal;

a first memory for recording said second identification number when said first identification number coincides with an assigned identification number;

a microphone for receiving a second speech signal;

a second decoder for extracting said second speech signal;

a second memory for recording said first speech signal and said second speech signal; and setting means for setting said communication device into a recording mode, wherein said second identification number is stored into said first memory and said first speech signal and said second speech signal are stored into said second memory when said communication device is set into said recording mode.

2. The communication device as claimed in claim 1, further comprising:

third memory for recording said second identification number temporarily while in a communication mode, and for transferring said second identification number to said first memory.

3. The communication device as claimed in claim 1, further comprising:

sending means for sending said second identification number stored in said first memory to said calling station in response to a transmission command signal from said setting means.

4. The communication device as claimed in claim 3, further comprising:

a speaker for reproducing said speech signal recorded in said second memory in response to a play command signal from said setting means before said second identification number is sent to said calling station.

5. The communication device as claimed in claim 4, further comprising:

a display for displaying said second identification number in response to a first command signal after said play command signal and before said transmission command signal.

6. The communication device as claimed in claim 3, wherein said sending means comprises:

a first coder for modulating said second identification number and for adding control signals to said second identification number.

7. The communication device as claimed in claim 6, said sending means further comprising:

a second coder for coding a speech signal to be transmitted and for supplying said coded speech signal to said first coder.

8. The communication device as claimed in claim 6, wherein said first coder and first decoder have an error correcting operation executable upon said speech signal.

9. A method for controlling a communication device which receives a channel signal including a first identification number of a destination and a second identification number of a calling station in a common control channel to set a communication channel between said calling station and said destination, and which receives a first speech signal in a speech channel, said communication device having a memory call origination, the method comprising the steps of:

detecting whether or not said first identification number included in said common control channel coincides with an assigned number;

extracting said second identification number from said control channel signal;

storing said second identification number temporarily when said first identification number coincides with said assigned number;

recording said first speech signal included in said communication channel and a second speech signal supplied by a callee of said communication device in response to a record command signal; and transferring said second identification number stored temporarily to another memory in response to said record command signal.

* * * * *